United States Patent
Ray et al.

(10) Patent No.: US 10,745,609 B2
(45) Date of Patent: Aug. 18, 2020

(54) CRYSTALLIZATION SUPPRESSANT COMBINATIONS FOR HIGH DENSITY CLEAR BRINE FLUIDS

(71) Applicant: LANXESS Solutions US Inc., Middlebury, CT (US)

(72) Inventors: Thomas G. Ray, El Dorado, AR (US); Colin H. Keene, Stephens, AR (US); David J. Sikora, Middlebury, CT (US); David W. Bartley, El Dorado, AR (US); John Warner, Wilmington, MA (US); Justin Whitfield, Billerica, MA (US); Dwight Tshudy, Salem, MA (US); Joni P. Williams, Medway, MA (US)

(73) Assignee: LANXESS Solutions US Inc., Shelton, CT (US)

( * ) Notice: Subject to any disclaimer, the term of this patent is extended or adjusted under 35 U.S.C. 154(b) by 0 days.

(21) Appl. No.: 15/944,007

(22) Filed: Apr. 3, 2018

(65) Prior Publication Data

US 2018/0223172 A1 Aug. 9, 2018

Related U.S. Application Data

(63) Continuation-in-part of application No. 15/650,458, filed on Jul. 14, 2017, now abandoned.

(60) Provisional application No. 62/362,099, filed on Jul. 14, 2016.

(51) Int. Cl.
| | |
|---|---|
| *C09K 8/86* | (2006.01) |
| *C09K 8/528* | (2006.01) |
| *C09K 8/08* | (2006.01) |
| *C09K 8/506* | (2006.01) |
| *C09K 8/68* | (2006.01) |

(52) U.S. Cl.
CPC ............ *C09K 8/528* (2013.01); *C09K 8/08* (2013.01); *C09K 8/506* (2013.01); *C09K 8/68* (2013.01); *C09K 8/86* (2013.01); *C09K 2208/12* (2013.01)

(58) Field of Classification Search
CPC ... C09K 8/68; C09K 8/05; C09K 8/06; C09K 2208/12; C09K 8/845; C09K 8/032; C09K 8/035; C09K 8/04; C09K 8/08; C09K 8/592; C09K 8/72; C09K 8/10; C09K 8/36; C09K 8/40; C09K 2208/18; C09K 8/03; C09K 8/12; C09K 8/52; C09K 8/62; C09K 8/685; C09K 8/86; C09K 17/06; C09K 2208/26; C09K 8/42; C09K 8/514; C09K 8/528; C09K 8/54; C09K 8/665; C09K 8/74; C09K 2208/02; C09K 2208/22; C09K 2208/28; C09K 8/424; C09K 8/426; C09K 8/5045; C09K 8/506; C09K 8/78; C09K 8/88
See application file for complete search history.

(56) References Cited

U.S. PATENT DOCUMENTS

| | | | |
|---|---|---|---|
| 6,635,604 B1 * | 10/2003 | Halliday | C09K 8/06 166/305.1 |
| 2017/0292055 A1 | 10/2017 | Alleman | |
| 2018/0016484 A1 | 1/2018 | Ray et al. | |
| 2018/0237679 A1 * | 8/2018 | Mack | C09K 8/03 |

* cited by examiner

*Primary Examiner* — Kumar R Bhushan

(57) ABSTRACT

Compounds are identified that act as crystallization suppressants when added to clear brine fluids, significantly lowering the true crystallization temperatures of the brines, and allowing for higher salt content in clear brine fluids. The crystallization suppressants of the invention also allow for the preparation of higher density zinc free brines. Crystallization suppressant blends are also identified that allow for the preparation of high density clear brine fluids with lower viscosities.

4 Claims, No Drawings

CRYSTALLIZATION SUPPRESSANT COMBINATIONS FOR HIGH DENSITY CLEAR BRINE FLUIDS

CROSS REFERENCE TO RELATED APPLICATIONS

This application is a continuation-in-part of pending U.S. application Ser. No. 15/650,458, filed Jul. 14, 2017, entitled "HIGH DENSITY CLEAR BRINE FLUIDS", which claims priority to U.S. Provisional Patent Application No. 62/362,099, filed Jul. 14, 2016, all incorporated herein by reference.

The addition of particular crystallization suppressants to high density clear brine fluids significantly lower the true crystallization temperatures of the fluids allowing for higher salt content in the fluids and for the preparation of, e.g., higher density zinc free brines.

BACKGROUND OF THE INVENTION

Clear brine fluids are solids-free, industrial fluids widely used in operations where control of pressure in a well is needed, such as in the oil and gas industry, and play an important role in oil exploration and development of deep water wells, high-pressure and deep oil wells, oil sands, and the like. Clear brine fluids find use in well completion, work-over, drilling and fracturing operations, and serve a variety of functions such as a displacement fluid to remove drilling muds, as drill-in fluids, as permanent packer fluid. They inhibit undesirable formation reactions such as clay swelling and are used in preparing well equipment for production, e.g., during insertion of liners, screens, packers, and other equipment.

Clear brine fluids can be prepared with a variety of salts, generally halide salts, at various concentrations to provide specific densities for particular applications. For example, brines with densities ranging, e.g., from 8.4 to over 22 lbs/gal (ppg), may be desired. Commonly used salts include chloride and bromide salts of sodium, potassium, calcium and zinc. Ammonium salts, iodine salts, and other metals have also been used. More than one salt may be present in the fluid.

Bromide fluids, e.g., sodium, potassium and calcium bromide brines, are high density clear brine fluids that are suitable for deepwater production and high temperature/high pressure oil and gas formations. For example, bromide fluids are used in deepwater fracturing operations in order to provide the necessary pressure in the well to successfully fracture the geological formation area that supplies oil and gas to the wellbore allowing for higher volume flows to the production piping.

Clear brine fluids are solids free and thus contain no particles that might plug or damage a producing well or equipment and are used over a wide temperature range. The amount of a particular salt in a brine fluid, and thus the density of the brine, is limited by the solubility of that salt in water. Precipitation of the salt during use must be avoided, and many salts cannot be used on their own in higher density solutions, e.g., 12 ppg or 14 ppg to 20 ppg. Historically, the need for high density clear brine fluids, e.g., >14.2 ppg, has been met by using zinc bromide to blend up calcium bromide to higher densities. Zinc bromide and cesium formate brines traditionally have been used to achieve higher density in completion fluids, up to 19 ppg for high pressure applications such as kill-fluid and on-the-shelf gas wells (high temperature/high pressure).

However, zinc based fluids have environmental and economic limitations. Zinc is regulated and not environmentally friendly and requires a zero-discharge system when in use. Zinc contaminated flow-back and well-produced water has to be collected and shipped to shore for disposal or treatment and cannot, e.g., be pumped off-rig into the Gulf of Mexico. These regulations and a growing consciousness regarding the contamination of ground water has increased the interest in new clear brine fluids that are more environmentally friendly and do not require zero-discharge. A clear brine fluid is needed that can provide high densities and low crystallization temperatures without using zinc components, which fluids can be used in applications typically served with the present zinc containing fluids such as zinc/calcium bromide brines.

However, it has been found that certain crystallization suppressant additives that provide a thermally stable, environmentally acceptable, high density brine, can also cause an unacceptable increase in viscosity of the brine. This may prevent the brine from being used in many applications. A crystallization suppressant product is still needed that will provide high density brines, e.g., 12 ppg or 14 ppg to 20 ppg, with acceptably low viscosity.

SUMMARY OF THE INVENTION

It has been found that certain organic compounds, e.g., certain sugars and 1,3-dicarbonyl compounds, can be added to clear brine fluids to lower the temperature at which the salt precipitates out of solution and increase the amount of a salt that will remain dissolved in the water. The addition of these compounds to non-zinc brines provides for new, high density, zinc-free, clear brine fluids having low true crystallization temperatures and good environmental compatibility.

One broad embodiment of the invention provides a method for reducing or lowering the true crystallization temperature of a clear brine fluid (CFB) by adding from 2 to 20 wt %, based on the combined weight of the halide salt and water, of a crystallization suppressant additive comprising an aldose or ketose having at least 4 carbon atoms, an oligosaccharide compound, an alditol having at least 3 carbon atoms, or a 1,3 dicarbonyl compound, e.g., a malonamide, having from 3 to 7 carbon atoms. A CFB of the invention typically comprises a halide salt and in most embodiments has a density of over 8.4 ppg, e.g., at least 9 ppg, often at least 10 ppg and frequently at least 12, 14, 14.2 or higher.

It has been found that, when added to a CBF, compounds above are highly effective in providing high density and low true crystallization temperature brines, however, some of these effective will also cause an increase in viscosity that can render the brine unsuitable for some uses. Another embodiment provides a method for preparing a low viscosity, high density CFB with a reduced or lower true crystallization temperature by adding to a high density CFB a crystallization suppressant composition comprising a mixture of compounds comprising an aldose, ketose, oligosaccharide compound, alditol or 1,3 dicarbonyl compound above. The mixture of compounds may include two or more compounds as described above, or it may comprise one or more compounds described above with a compound outside the above description.

"True crystallization temperature" is the temperature at which the salt begins to crystallize out from a clear brine fluid (CBF) under conditions where the crystallization temperature is determined by the salt composition, i.e., the composition and the concentration of the salt, in the fluid. The crystallization temperature of a CBF can be influenced by changes in pressure and other factors, but the true crystallization temperature excludes these factors and is determined only by the composition of the fluid itself. In the present disclosure, true crystallization temperatures are determined using API Protocol 13J 5th Edition, October 2014 "Testing of Heavy Brines".

Another broad embodiment of the invention provides a clear brine fluid having a density at 60° F. of at least 9 ppg, typically 10 ppg, 12 ppg or 14 ppg and often 14.2 or higher, comprising water, a salt, generally a halide salt, and from 2 to 20 wt %, based on the combined weight of the water and halide salt, of an aldose or ketose having at least 4 carbon atoms, an alditol having at least 3 carbon atoms, or a 1,3 dicarbonyl compound having from 3 to 7 carbon atoms as a crystallization suppressant.

In certain embodiments, excellent results are obtained when the crystallization suppressant comprises a $C_{4-6}$ alditol, e.g., a $C_5$ or $C_6$ alditol such as xylitol or sorbitol, or a diamide such as a $C_{3-7}$ malonamide, e.g., the compound malonamide itself. The clear brine fluids of the invention have a true crystallization temperature lower than similar CFBs of the same density that do not contain the crystallization suppressant.

In other embodiments, excellent results in obtaining a low viscosity, high density CBF are obtained when a compound above, that is shown to have excellent crystallization suppressant properties, for example, a C4-6 alditol, such as, mannitol, xylitol or sorbitol, is added to a high density CBF as part of a mixture with another compound that, on its own, might have performance deficiencies or be otherwise physically unsuitable. Such mixtures are shown to be capable of limiting the increase in viscosity without adversely affecting the desired crystallization suppressant activity. One such mixture comprises, e.g., sorbitol and glycerol.

In many embodiments, the halide salt of the CBF of the invention comprises a chloride or bromide salt of sodium, potassium or calcium. In the present disclosure, the article "a" or "an", unless otherwise indicated or necessarily inconsistent with the context, means one or more than one, and more than one salt may be present. Likewise, one or more than one crystallization suppressant compound of the invention may be used. Other components common in the art may also be present in the inventive fluid, including, e.g., other crystallization suppressants or additives to improve a particular property of the CBF, but any of these other components need to be stable under the potentially harsh conditions the present fluids may face, and, if present, these other components make up only a small part of the fluid, e.g., less than 10 wt % or less than 5 wt %, or less than 2 wt %.

In particular embodiments the clear brine fluid comprises less than 1 ppm, e.g., less than 0.5 ppm of zinc or cesium.

DESCRIPTION OF THE INVENTION

One embodiment provides a method for lowering the true crystallization temperature of a clear brine fluid, typically comprising a halide salt and water, and generally having a density of at least 9 ppg, at least 10 ppg, at least 14 ppg, e.g., at least 14.2 ppg, which method comprises adding to the clear brine fluid from 2 to 20 wt %, e.g., from 5 to 20 wt % or from 8 to 20 wt %, based on the combined weight of water and salt, typically a halide salt, of a crystallization suppressant additive comprising an aldose or ketose having at least 4 carbon atoms, e.g., an aldose or ketose having from 4 to 6 or from 5 to 6 carbon atoms, an alditol having at least 3 carbon atoms, e.g., from 4 to 6 carbon atoms, e.g. 5 or 6 carbon atoms, or a 1,3 dicarbonyl compound, e.g., a malonamide, having from 3 to 7 or from 3 to 5 carbon atoms.

The salt may be a metal or ammonium salt. Typically the salt comprises a chloride or bromide salt of sodium, potassium or calcium. In particular embodiments the CFB is zinc free and/or cesium free meaning that it contains less than 1 ppm, e.g., less than 0.5 ppm, of zinc and/or cesium.

For example, in some embodiments the method comprises adding to a CBF comprising water and a chloride or bromide salt of sodium, potassium or calcium and having a density of at least 9, 10, 12, 14, 14.2 ppg or higher, from 2 to 20 wt %, based on the combined weight of salt and water, of a crystallization suppressant described above, wherein the CFB contains less than 1 ppm, e.g., less than 0.5 ppm, of zinc and/or cesium.

In particular embodiments, the method comprises adding as a crystallization suppressant malonamide, or a $C_5$ or $C_6$ alditol, such as xylitol or sorbitol.

Other embodiments provide a clear brine fluid that is free of solids comprising a salt, typically a halide salt, and from 2 to 20 wt %, e.g., from 5 to 20 wt % or from 8 to 20 wt %, based on the combined weight of water and salt, of a crystallization suppressant additive comprising an aldose or ketose having at least 4 carbon atoms, e.g., an aldose or ketose having from 4 to 6 or from 5 to 6 carbon atoms, an alditol having at least 3 carbon atoms, e.g., from 4 to 6 carbon atoms and often 5 or 6 carbon atoms, or a 1,3 dicarbonyl compound, e.g., a malonamide, having from 3 to 7 or from 3 to 5 carbon atoms.

The clear brine fluids of the invention have a density at 60° F. of at least 9 ppg, typically at least 10 ppg, e.g., at least 12 ppg and in many embodiments at least 14 or 14.2 ppg, and often greater than 14.2 ppg. The halide salt generally comprises a chloride or bromide salt of sodium, potassium or calcium, e.g., a chloride or bromide salt of sodium or calcium, and in certain embodiments the salt comprises a bromide salt, e.g., sodium or calcium bromide, often calcium bromide. Generally, the CFB is zinc and/or cesium free meaning that it contains less than 1 ppm, e.g., less than 0.5 ppm, of zinc and/or cesium.

For example, some embodiments of the invention provide a clear brine fluid having a density of at least 10, ppg, 12 ppg or 14 ppg, e.g., at least 12, 14 or 14.2 ppg or higher, comprising water, a halide salt, less than 1 ppm of zinc or cesium, and from 2 to 20 wt %, based on the combined weight of the water and halide salt, of an aldose or ketose having 4 to 6 carbon atoms, an alditol having 4 to 6 carbon atoms, or a malonamide having 3 to 7 or 3 to 5 carbon atoms, e.g., a $C_5$ or $C_6$ alditol, such as sorbitol or xylitol, or malonamide. In some embodiments, the density of the CFB is greater than 15 ppg.

As previously mentioned, one or more than one halide salt may be present and more than one crystallization suppressant may be used. For example, in one embodiment, a method for lowering the true crystallization temperature of a clear brine fluid, and the fluid obtained by a method comprising adding to a clear brine fluid a crystallization suppressant additive comprising a mixture of two or more compounds selected from aldoses or ketoses having at least 4 carbon atoms, alditols having at least 3 carbon atoms, and 1,3 dicarbonyl compounds having from 3 to 7 carbon atoms.

The amount of salt in the fluid will vary depending on the chemical formula and solubility of the salt, and the desired density of the fluid. The salt must of course be soluble in high enough concentrations to obtain to densities needed. In many embodiments, the fluid comprises as a salt, calcium chloride, sodium bromide or calcium bromide in concentrations of greater than 35 wt %, in some embodiments the fluid comprises sodium bromide or calcium bromide in concentrations of greater than 40 wt %. In particular embodiments, the fluid comprises over 45 wt % calcium bromide, e.g., 50 wt % calcium bromide or higher. For example, zinc and cesium free fluids of the invention comprising an alditol or a malonamide crystallization suppressant and 56 wt %, 60 wt %, or 64 wt % calcium bromide were clear and solid free at temperatures below 20° F.

In one example, at a concentration of 61.5%, calcium bromide will begin to precipitate from an aqueous solution at approximately 83° F., however, adding a crystallization inhibitor of the invention at a loading of about 15% lowers the temperature at which calcium bromide begins to precipitate to 4.5° F. Table 1 illustrates the activity of crystallization suppressants of the invention when added to a brine comprising 61.5 wt % $CaBr_2$. TCT is true crystallization temperature.

TABLE 1

TCT of 61.5 wt % $CaBr_2$ aqueous solution

| | wt % Additive | TCT | Density @ 60° F. | Density @ 100° F. |
|---|---|---|---|---|
| No additive | 0 | 86.3° F. | — | 15.6 ppg |
| D-sorbitol | 12.5% | 8.6° F. | 15.01 ppg | — |
| Malonamide | 13.5% | 5.5° F. | 14.89 ppg | — |
| Xylitol | 15.0% | 4.5° F. | 14.91 ppg | — |

Obviously, to maintain a clear, solid free fluid, each component present in the brine, including the crystallization suppressant, must also be soluble in the brine at the needed concentrations and temperature of use.

Given that clear brine fluids are used over a wide temperature range, not only do the brines need to stay clear and free of solids at lower temperatures, e.g., below 60 or 50° F., and in some applications below 40° F., e.g., below 30 or 20° F., but because the fluids are often used at high temperatures and pressure, the components in the fluid should be, and often must be, stable at high temperatures, e.g., greater than 250° F. and often greater than 400° F. or 450° F. While the salts are typically stable at such temperatures, an effective crystallization suppressant must also be thermally stable at the temperatures at which the fluid is used. Thus, preferred crystallization suppressants are shown to be thermally stable, as determined by thermal gradient analysis (TGA), above temperatures well above 250° F., typically, preferred suppressants are shown to be thermally stable at temperatures of 400° F. or higher, e.g., 450° F. or higher.

While clear brine fluids are special fluids meeting specific density and stability requirements, other issues common to the handling of any fluid will also play a role in selecting the proper CBF for a particular use. For example, in many applications where clear brine fluids are used, it is important that the fluids can be pumped in large quantities and/or high rates and a fluid that is too viscous may be problematic. It is possible that a stable CBF with the proper density may be undesirable for use because of overly high viscosity. The viscosity of a fluid may therefore need to be evaluated along with other features formulating a CBF, and the formulation may need to be adjusted to provide the proper handling characteristics.

For example, various amounts of sorbitol were added to brines having a $CaBr_2$ concentration of about 60-65 wt % to provide clear brine fluids with densities of more than 15 ppg, i.e., 15.2-15.3, and a TCT of ~15° F., ~10° F. and ~5° F. The density and TCT each depend on the amounts of sorbitol added and the concentration of $CaBr_2$ in the fluid. As more sorbitol is added, the TCT is lowered, however the viscosity increases as shown in the table below. The high viscosities, e.g., over 250 cps, can limit the use of the brine in some applications. See table B1.

Work was undertaken to find a way to provide the low TCT and high density of the brine with maintaining a lower viscosity in the resulting CBF. Obviously, any compound or mixture of compounds used must form a stable solution in the brine and be thermally stable, as described herein. Blends made with sorbitol and urea appeared to lower viscosity, but these blends were not thermally stable, forming solids when heated at 200° F. for about one day. A 50/50 blend of sorbitol and glycerol, however, provided low TCTs, high densities, and lower viscosity, and passed the thermal stability test. Data from a CBF comprising a sorbitol/glycerol blend is shown in table B1.

TABLE B1

| Crystallization Suppressant | TCT ° F. | Density ppg | Viscosity, cps, 40° F. |
|---|---|---|---|
| Sorbitol | 4.2 | 15.2 | 400 |
| Sorbitol | 10.8 | 15.2 | 300 |
| Sorbitol | 14.5 | 15.3 | 270 |
| Glycerin/Sorbitol 50/50 | 6.4 | 15 | 225 |

Another embodiment of the invention thus provides a method for reducing the true crystallization temperature of a clear brine fluid while limiting the increase in viscosity.

The method comprises adding to a clear brine fluid comprising a halide salt and water and having a density of 10 ppg or higher, 12 ppg or higher, or 14 ppg or higher, from 2 to 20 wt %, e.g., from 5 to 20 wt % or from 8 to 20 wt %, based on the combined weight of water and salt, a crystallization suppressant blend comprising:

a mixture of either two or more of an aldose or ketose having at least 4 carbon atoms and/or an alditol having at least 3 carbon atoms; or a mixture comprising at least one aldose or ketose having at least 4 carbon atoms or an alditol having at least 3 carbon atoms with another suitable compound such as an amine, amino acid, alcohol or polyol other than an aldose, ketose having or an alditol.

Typically, the crystallization suppressant blend added to the brine is a mixture of either two or more of an aldose or ketose having at least 4 carbon atoms and/or an alditol having at least 3 carbon atoms;

or is a mixture comprising at least one aldose or ketose having at least 4 carbon atoms or an alditol having at least 3 carbon atoms and a polyol having from 2 to 100 carbon atoms, other than an aldose, ketose or an alditol, e.g., a glycol having from 2 to 100 carbon atoms such as an alkylenoxy glycol, e.g., an ethylenoxy glycol, or an alkylene glycol, e.g., a $C_{2-20}$ alkylene glycol such as propylene glycol.

Often the crystallization suppressant blend comprises an aldose or ketose having from 4 to 6 or from 5 to 6 carbon atoms, or an alditol having from 3 to 15 carbon atoms. For example, in some embodiments, the crystallization suppressant blend comprises two alditols of 3 to 6 carbon atoms, such as glycerol and sorbitol, but blends comprising tripentaerythritol have proven successful.

The less viscous CFB produced by the method has a density at 60° F. of 10 ppg or more, often 14 ppg or more. However, the value of the method is more readily appreciated in preparing less viscous, higher density CFBs, e.g. a less viscous high density $CaBr_2$ brine with a density of 14 ppg or more, than a lower density brine e.g., 10 ppg.

Thus, in some embodiments of the invention, the low viscosity CFB of the invention has a density at 60° F. of least 14 ppg of higher, e.g., 14.4 ppg or higher, 14.7 ppg or higher, 14.8 ppg or higher, or 15.0 or higher.

Generally, the low viscosity brine of the invention, including those with a density of 14 ppg and higher, has a Brookfield viscosity at 40° F. of 250 cps or less, 200 cps or less, 150 cps or less, and in some embodiments, 125 cps or less, or 100 cps or less, measured as Brookfield viscosity at 40° F. using a #18 spindle at 60 rpm.

Generally, the less viscous CFB produced by this method has a TCT of 20° F. or less, and often 15° F. or less, 10° F. or less, 5° F. or less.

In many embodiments the density at 60° F. is 13 ppg or higher, 14 ppg or higher, 14.4 ppg or higher, 14.8 ppg or higher, or 15 ppg or higher.

In some embodiments, the viscosity at 40° F. is 200 cps or less, or 150 cps or less, and in some select embodiments, 125 cps or less, or 100 cps or less.

For example, in some select embodiments, the less viscous CFB of the invention has a TCT 15° F. or less, 10° F. or less, 5° F. or less, e.g., 10° F. or less, and a density at 60° F. of 14 ppg or higher, 14.6 ppg or higher, 14.8 ppg or higher, or 15 ppg or higher, e.g., 14.8 or higher and a viscosity at 40° F. of 200 cps or less. In some of these select embodiments, the less viscous CFB of the invention has a viscosity at 40° F. of 150 cps or less, 125 cps or less, or 100 cps or less.

As above, the concentration of salt, e.g., calcium chloride, sodium bromide or calcium bromide, in the less viscous CFB is often greater than 35 wt %, generally, greater than 40 wt % or 45 wt %, and in many embodiments 50 wt % or more. For example, zinc and cesium free, less viscous CFBs of the invention comprising 50 to 64 wt % calcium bromide were clear and solid free at temperatures below 20° F., in many embodiments, at temperatures below 15° F., 10° F. or 5° F.

For example, in many embodiments the less viscous CFB is prepared by adding the blend comprising the aldose or ketose having at least 4 carbon atoms and/or an alditol having at least 3 carbon atoms to brines containing 55-65 wt % $CaBr_2$.

A series of CFBs were prepared by adding various amounts of glycerol/sorbitol blends of different weight ratios to brines of $CaBr_2$ with a CaBr2 concentration of about 60-65 wt % to provide clear brine fluids with densities of between 14.8 and 15.3 ppg and TCT of 10° F. or less. The glycerol/sorbitol ratios, TCT, density at 60° F., and viscosity shown in the table below. Also shown for comparison are samples from above using sorbitol alone as the suppressant, and a sample using glycerol alone.

| Crystallization Suppressant | TCT ° F. | Density ppg | Viscosity, cps, 40° F. |
| --- | --- | --- | --- |
| Sorbitol | 4.2 | 15.2 | 400 |
| Sorbitol | 10.8 | 15.2 | 300 |
| Glycerol | 18 | 14.8 | 135 |
| Glycerol/Sorbitol | | | |
| 50/50 | 6.4 | 15 | 225 |
| 75/25 | 7.7 | 14.8 | 145 |

| Crystallization Suppressant | TCT ° F. | Density ppg | Viscosity, cps, 40° F. |
| --- | --- | --- | --- |
| 70/30 | −1.5 | 14.8 | 165 |
| 70/30 | 7.4 | 15.0 | 225 |
| 70/30 | 7.6 | 14.9 | 100 |
| 70/30 | −0.8 | 14.8 | 110 |
| 70/30 | 6.3 | 14.8 | 105 |
| 80/20 | 2.5 | 14.8 | 150 |

Sorbitol alone did not deliver the low TCT desired without large increases in viscosity. Glycerol alone was not able to provide TCTs of 10 or less at the high densities desired. However, even though it was found that adding glycerol along with sorbitol can slightly lower the resulting densities, blending the two provided an effective and flexible approach to preparing brines with a balance of very high densities, very low TCTs, and significantly lower viscosity when compared to similar brines using only sorbitol as suppressant.

The blends above comprise a three carbon alditol with a six carbon alditol in weight ratios of 80/20 to 50/50, (glycerol to sorbitol), however, other alditols can be used, as can aldoses or ketoses, and the ratios will vary according to the components of the blend, e.g., 95:5 or 90:10 to 50:50 etc., of the two components in a binary blend may be employed. Also, 3-component, 4-component, and higher order blends can be used.

When a blend comprises a compound outside of an aldose or ketose having at least 4 carbon atoms and alditol having at least 3 carbon atoms, at least 20 wt % of the blend will be at least one aldose or ketose having at least 4 carbon atoms or alditol having at least 3 carbon atoms. For example, in many such embodiments, at least 25 wt % of the blend will be at least one aldose or ketose having at least 4 carbon atoms or alditol having at least 3 carbon atoms.

In addition to the Glycerol/Sorbitol blends above, other blends were tested with mixed success. A sampling of the data is shown below.

| Sample Name | TCT ° F. | Density ppg | Viscosity, 40° F., cps |
| --- | --- | --- | --- |
| Sorbitol/Mannitol 50/50 | 1.7 | 15.2 | 480 |
| Sorbitol/Propylene Glycol 50/50 | 13.7 | 14.6 | 190 |
| Sorbitol/Pentaerythritol 25/75 | 22.5 | 14.9 | 245 |
| Sorbitol/Tripentaerythritol 50/50 | 30.4 | 15.0 | 290 |
| Sorbitol/Tripentaerythritol 25/75 | 43 | 15.0 | 370 |
| Sorbitol/B-Alanine 75/25 | −1.5 | 15.0 | 280 |
| Sorbitol/B-Alanine 50/50 | Solids formed | N/A | 340 |
| Glycerol/Propylene Glycol 50/50 | 24.5 | 14.4 | 90 |
| Glycerol/Propylene Glycol 75/25 | 12.8 | 14.6 | 110 |
| Glycerol/Tripentaerythritol 75/25 | 16.8 | 14.8 | 160 |

As is well known in the chemical arts, sugars, such as those useful in the invention, i.e., aldoses, hexoses and alditols, are generally available in two optically active forms, D and L, often one of the forms is more prevalent in nature. Generally, the naturally occurring sugar will more economically attractive and will be the one chosen for use in the present invention, e.g., D-sorbitol, but the opposite, less naturally abundant form of such sugars may be used in some embodiments, but mixtures of a D and L sugar may not perform the same as a composition wherein only, or predominately, one optically active form is present.

Alternately, oligosaccharide compounds may be used as a crystallization suppressant as described in this disclosure, instead of or in addition to the disclosed aldoses, hexoses and alditols. For example, the oligosaccharide compound may be a cyclodextrin, such as α (alpha)-cyclodextrin (a 6-membered sugar ring molecule), β (beta)-cyclodextrin (a 7-membered sugar ring molecule), or γ (gamma)-cyclodextrin (an 8-membered sugar ring molecule) or a mixture of two or more cyclodextrins.

The present invention provides a process for lowering the TCT of a CFB and in certain embodiments provides zinc free clear brine fluids, comprising e.g., halide salts of sodium or calcium, with densities of greater than 14.2 and TCTs or less than 20° F.

The invention allows one to move away from zinc based CBF's when preparing higher density brines. The new, zinc free clear brine fluids of the invention are solids free, high density, environmentally friendly, are a cost-effective alternative to zinc bromide and cesium formate completion fluids, and do not require zero-discharge like zinc based CBF's.

EXAMPLES

Aqueous calcium bromide samples comprising 53 to 65 wt % calcium bromide solution and 2 to 20 wt % crystallization suppressant were prepared by adding the crystallization suppressant, i.e., D-sorbitol, malonamide or xylitol, to an aqueous solution of calcium bromide. Generally, some heating is required prior to addition of crystallization suppressant to create a clear $CaBr_2$ solution at higher assays.

In the following examples, true crystallization temperature was established according to API Protocol 13J 5th Edition, October 2014 "Testing of Heavy Brines". Clear brine fluid density of test samples was determined at 60° F. using an Anton PAAR Density Meter set at 60° F. and the results compared to the solution without suppressant. Density of the $CaBr_2$ solution without suppressant is determined at 100° F. due to the higher TCT of the suppressant free fluids.

In the examples, the assay and density of the starting CBF is lowered due to the mass amount of the crystallization suppressant added, however, much higher aqueous brine concentrations can be reached before crystallization occurs due the drastic drop in TCT.

Examples 1-3: D-Sorbitol as Crystallization Suppressant

Ex. 1—D-Sorbitol was added in progressively larger amounts to a 61.5% $CaBr_2$ aqueous solution and the TCT and density at 60° F. was determined.
Ex 2.—D-Sorbitol was added in progressively larger amounts to a 62% $CaBr_2$ aqueous solution and the TCT and density at 60° F. was determined.
Ex. 3—D-Sorbitol was added in progressively larger amounts to a 64% $CaBr_2$ aqueous solution and the TCT and density at 60° F. was determined.

Results for examples 1-3 are shown in the table below:
Sorbitol as Crystallization Suppressant

| wt % $CaBr_2$ | wt % D-sorbitol | TCT | Density @ 60° F. | Density @ 100° F. |
|---|---|---|---|---|
| 61.5% | 0 | 86.3° F. | — | 15.6 ppg |
| 61.5% | 12.5% | 8.6° F. | 15.01 ppg | — |
| 62% | 0 | 88.9° F. | — | 15.7 ppg |
| 62% | 13.6% | <−12° F. | 15.10 ppg | — |
| 64% | 0 | 93.2° F. | — | 16.2 ppg |
| 64% | 15% | 19.9° F. | 15.47 ppg | — |

Examples 4-6: Malonamide as Crystallization Suppressant

Ex. 4—Malonamide was added in progressively larger amounts to a 61.5% $CaBr_2$ aqueous solution and the TCT and density at 60° F. was determined.
Ex. 5—Malonamide was added in progressively larger amounts to a 63% $CaBr_2$ aqueous solution and the TCT and density at 60° F. was determined.
Ex. 6—Malonamide was added in progressively larger amounts to a 63.5% $CaBr_2$ aqueous solution and the TCT and density at 60° F. was determined.

Results are shown in the following table:
Malonamide as Crystallization Suppressant

| wt % $CaBr_2$ | wt % Malonamide | TCT | Density @ 60° F. | Density @ 100° F. |
|---|---|---|---|---|
| 61.5 | 0 | 86.3° F. | — | 15.6 ppg |
| 61.5 | 13.5% | 5.5° F. | 14.89 ppg | — |
| 63% | 0 | 91.4 ° F. | — | 15.89 ppg |
| 63% | 14.0% | 1.4° F. | 14.94 ppg | — |
| 63.5% | 0 | 92° F. | — | 16.04 ppg |
| 63.5% | 15.1% | 4.0° F. | 15.06 ppg | — |

Examples 7-9: Xylitol as Crystallization Suppressant

Ex. 7—Xylitol was added in progressively larger amounts to a 61.5% $CaBr_2$ aqueous solution and the TCT and density at 60° F. was determined.
Ex. 8—Xylitol was added in progressively larger amounts to a 63% $CaBr_2$ aqueous solution and the TCT and density at 60° F. was determined.
Ex. 9—Xylitol was added in progressively larger amounts to a 63.5% $CaBr_2$ aqueous solution and the TCT and density at 60° F. was determined.

Results are shown in the table below:
Xylitol as Crystallization Suppressant

| wt % $CaBr_2$ | wt % Xylitol | TCT | Density @ 60° F. | Density @ 100° F. |
|---|---|---|---|---|
| 61.5 | 0 | 86.3° F. | — | 15.6 ppg |
| 61.5 | 15% | 4.5° F. | 14.91 ppg | — |
| 63% | 0 | 91.4° F. | — | 15.89 ppg |
| 63% | 17% | 7.4° F. | 15.00 ppg | — |
| 64% | 0 | 93.2° F. | — | 16.2 ppg |
| 64% | 16.5% | 14.4° F. | 15.17 ppg | — |

The suppression of TCT allows increases in concentrations of calcium bromide in water to reach higher densities.

Low Viscosity Clear Brine Fluids

Example 10

To a Base fluid comprising 61.5% by weight Calcium Bromide in water, was added a in a 50:50 blend by weight of glycerol and sorbitol to obtain brine comprising 13.89 wt % by weight of the sorbitol and glycerol blend, based on the weight of the resulting composition, to yield a low viscosity, high density clear brine fluid with a TCT of 5.3° F., a density at 60° F. of 14.99 ppg, and a Brookfield viscosity at 40° F. of 221 cps.

Example 11

To a Base fluid comprising 60.45% by weight Calcium Bromide in water, was added a 70/30 blend by weight of glycerin and sorbitol to obtain fluid comprising 12.25% by weight of the sorbitol and glycerin blend, based on the weight of the resulting composition to yield a low viscosity, high density clear brine fluid with a TCT of 0° F., a density at 60° F. of 14.896 ppg, and a Brookfield viscosity at 40° F. of 114 cps.

Examples 12-31

Following the procedure of Example 10, additional low viscosity clear brine fluids were prepared. Compositions, TCT, Density at 60° F. and Brookfield viscosity obtained at 40° F. using a #18 spindle at 60 rpm are of Examples 12-31 are shown in the table below.

| Example | Recrystallization Suppressant | TCT ° F. | Density, ppg 60° F. | Visc, 40° F., #18 spindle, 60 rpm |
|---|---|---|---|---|
| 12 | Glycerol/Sorbitol 50/50 | 6.4 | 15.0 | 225 |
| 13 | Glycerol/Sorbitol 75/25 | 7.7 | 14.8 | 145 |
| 14 | Sorbitol/Mannitol 50/50 | 1.7 | 15.2 | 480 |
| 15 | Glycerol/Propylene Glycol 50/50 | 24.5 | 14.4 | 90 |
| 16 | Sorbitol/Propylene Glycol 50/50 | 13.7 | 14.6 | 190 |
| 17 | Sorbitol/Tripentaerythritol 50/50 | 30.4 | 15.0 | 290 |
| 18 | Glycerol/Propylene Glycol 75/25 | 12.8 | 14.6 | 110 |
| 19 | Glycerol/Sorbitol 75/25 (HiConc.) | 19.3 | 15.0 | 255 |
| 20 | Sorbitol/B-Alanine 75/25 | −1.5 | 15.0 | 280 |
| 21 | Sorbitol/Tripentaerythritol 25/75 | 43 | 15.0 | 370 |
| 22 | Sorbitol/B-Alanine 50/50 | Solids formed | N/A | 340 |
| 23 | 100% Glycerol | 18 | 14.8 | 135 |
| 24 | Glycerol/Tripentaerythritol 75/25 | 16.8 | 14.8 | 160 |
| 25 | Glycerol/Sorbitol 70/30 | −1.5 | 14.8 | 165 |
| 26 | Glycerol/Sorbitol 80/20 | 2.5 | 14.8 | 150 |
| 27 | Sorbitol/Pentaerythritol 25/75 | 22.5 | 14.9 | 245 |
| 28 | G/S 70/30 | 7.4 | 15.0 | 225 |
| 29 | G/S 70/30 | 7.6 | 14.9 | 100 |
| 30 | G/S 70/30 | −0.8 | 14.8 | 110 |
| 31 | G/S 70/30 | 6.3 | 14.8 | 105 |

What is claimed:

1. A method for lowering the true crystallization temperature of a clear brine fluid comprising a halide salt and water and having a density of 14 ppg or more, which method comprises adding from 8 to 20 wt %, based on the combined weight of the halide salt and water, of a crystallization suppressant blend comprising a mixture comprising glycerol and sorbitol, wherein the weight ratio of the glycerol to sorbitol is higher than 50:50, but no higher than 80:20 to provide a clear brine fluid with a true crystallization temperature of 15° F. or less and a viscosity at 40° F., measured as Brookfield viscosity using a #18 spindle at 60 rpm, of 200 cps or less.

2. The method according to claim 1 wherein the halide salt is a chloride or bromide salt of sodium, potassium or calcium, and the clear brine fluid comprises less than 1 ppm of zinc or cesium.

3. A clear brine fluid having a density of 14 ppg or more, comprising water, a halide salt, and from 8 to 20 wt %, based on the combined weight of the water and halide salt, of a crystallization suppressant blend comprising glycerol and sorbitol, wherein the weight ratio of the glycerol to sorbitol is higher than 50:50, but no higher than 80:20, and wherein the clear brine fluid has a true crystallization temperature of 15° F. or less and a viscosity at 40° F., measured as Brookfield viscosity using a #18 spindle at 60 rpm, of 200 cps or less.

4. The clear brine fluid according to claim 3 wherein the halide salt comprises a chloride or bromide salt of sodium, potassium or calcium, and the clear brine fluid comprises less than 1 ppm of zinc or cesium.

* * * * *